United States Patent [19]

Szeliga

[11] 4,294,277

[45] Oct. 13, 1981

[54] FLOW CONTROL APPARATUS

[75] Inventor: Philip C. Szeliga, Utica, N.Y.

[73] Assignee: Foam Controls, Inc., New Hartford, N.Y.

[21] Appl. No.: 167,127

[22] Filed: Jul. 9, 1980

[51] Int. Cl.³ .................. G05D 7/06; G05D 11/13
[52] U.S. Cl. ............................ 137/101.19; 137/486; 137/552; 137/606; 239/68
[58] Field of Search ............... 137/101.19, 88, 486, 137/606; 239/61, 68

[56] References Cited

U.S. PATENT DOCUMENTS

| 3,474,815 | 10/1969 | Beahm | 137/101.19 |
| 3,705,792 | 12/1972 | Peters | 137/101.19 X |
| 4,204,612 | 5/1980 | Schrader | 239/61 X |
| 4,234,007 | 11/1980 | Titone | 137/101.19 |

Primary Examiner—Robert G. Nilson
Attorney, Agent, or Firm—Bruns & Jenney

[57] ABSTRACT

A system for injecting foam insulation into a wall cavity or the like that includes a flow control section having a detecting means for automatically inhibiting the control section when the gun is placed in an inoperative or off condition.

11 Claims, 4 Drawing Figures

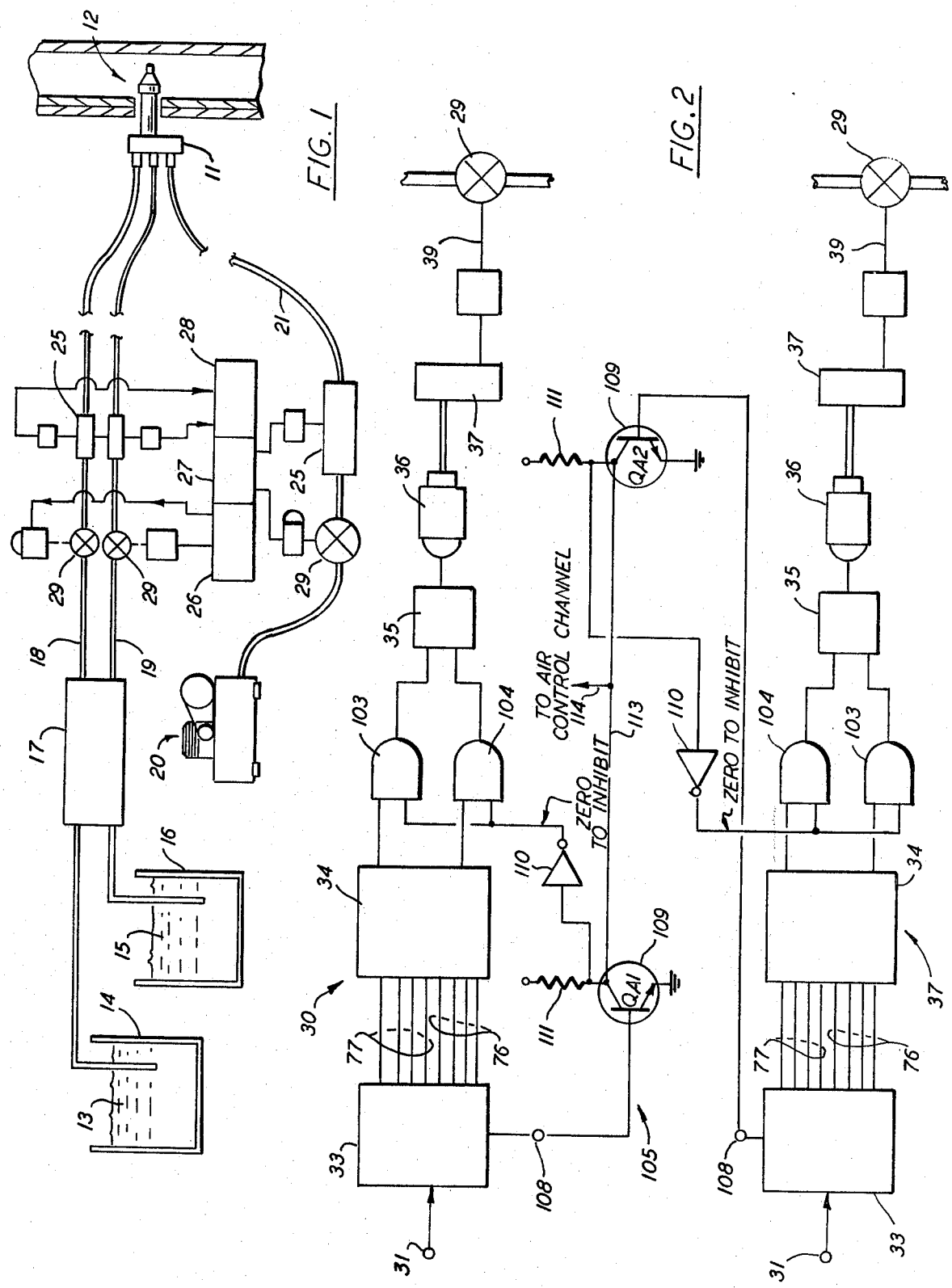

N-INHIBIT COMPENSATOR

FLOW CONTROL APPARATUS

BACKGROUND OF THE INVENTION

This invention relates to a flow control unit for use in a gun system for injecting foam insulation into a wall cavity and, in particular, to detecting means for automatically inhibiting the flow control unit in the event the injection gun is turned off.

In U.S. Pat. No. 4,204,612, there is disclosed a control system for accurately regulating the amount of resin and foaming agent delivered to the mixing chamber of an injecting gun. As noted in this patent, it is extremely important for the production of quality foam insulation having a high R value that the two components be mixed in the proper amounts at the point of injection. Any slight deviation from the optimum flow rate will cause the insulation to fail. To overcome this difficulty, flow detecting means are positioned in the lines bringing resin and foaming agent to the gun and providing an output signal indicative of the flow rate in each line. The flow rate is compared to preselected upper and lower limits and, if the actual flow is outside of the selected limits, a control valve in the line is automatically adjusted to bring the flow back into limits.

Initially, a switch was positioned upon the gun which, when manually closed, informed the flow control circuitry that the operator had shut the gun down. However, prior to closing the switch the control circuitry, not knowing that the gun had been turned off, would initiate corrective action that invariably would tend to move the control valves into a wide open position. Turning the gun on again would cause the control system to compensate in the other direction in an attempt to bring the flow back into limits. Because of the initial open position of the valves, it generally took some time for the system to "settle down". During this time less than quality foam was being produced. Besides being wasteful, the manually operated switch arrangement produced a good deal of wear on the mechanical components of the system and introduced operational problems in regard to the electrical control circuitry.

SUMMARY OF THE INVENTION

It is therefore an object of the present invention to improve gun systems for injecting at least two components into a receiving area.

Another object of the present invention is to improve the response time of a flow control system used to blend two or more components.

A further object of the present invention is to extend the operating life of the mechanical components contained in a flow control utilizing a mixing gun.

A still further object of the present invention is to improve the reliability of the control circuitry used in a foam insulation system or other similar systems for mixing fluid materials.

Still another object of the present invention is to automatically inhibit the flow control circuitry of a mixing system when the application gun is turned off.

These and other objects of the present invention are attained by means of a flow control system for bringing a plurality of materials to the mixing chamber of an application gun that includes an independent flow channel for bringing each of the materials from a supply reservoir to the mixing chamber of the guns, a flow sensor in each channel for detecting the actual rate of flow passing therethrough, comparitor means for comparing the actual rate of flow in each channel with preselected limits, automatic adjusting means for bringing the rate of flow in each channel within the selected limits in the event the flow moves outside of the selected limits and zero flow detecting means for inhibiting the adjusting means in the event all the sensed flows fall below limits at the same time.

BRIEF DESCRIPTION OF THE DRAWINGS

For a better understanding of these and other objects of the present invention reference is had to the following detailed description of the invention which is to be read in conjunction with the accompanying drawings, wherein:

FIG. 1 is a schematic representation of a flow control system for regulating the rate at which a plurality of materials are brought together within the mixing chamber of an applicator gun;

FIG. 2 is a block diagram showing two individual flow channels utilized in the system in FIG. 1 further illustrating a zero flow detecting circuit operatively connected therebetween;

DESCRIPTION OF THE INVENTION

Figure 3:
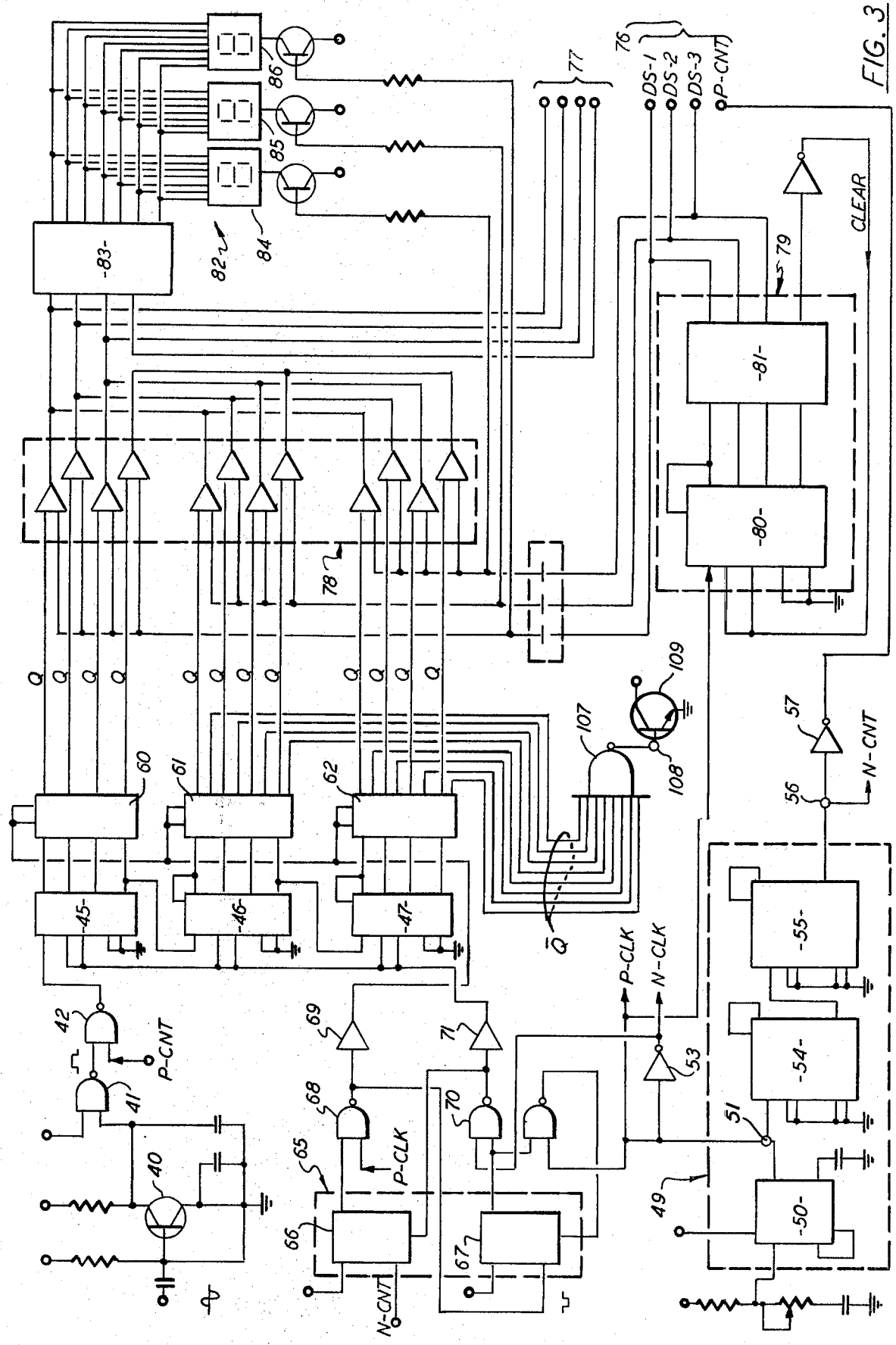
FIG. 3 is a circuit diagram of the flow metering ciruit used in each of the individual flow channels.

Referring initially to FIG. 1, there is shown a flow control system, generally referenced 10, for bringing together two or more fluids so that they may be mixed and then injected into a receiving area. The term "fluid", as herein used, refers to a liquid vapor or gas and is not necessarily limited to any one combination thereof. Although the present flow control system shall be herein described with reference to the application of foam insulation into a wall cavity, it is believed that the present invention has wider utility and can be employed in any number of suitable applications wherein the flow of a plurality of materials must be closely controlled as the materials are brought into a mixing chamber or the like.

As is well known in the application of foam insulation, a resin and a foaming agent are mixed with compressed air in the mixing chamber 11 of an application gun 12. The resin 13 and the foaming agent 15 are stored in supply drums 14 and 16 respectively. The two materials are drawn from the supply drums by means of a pump set 17 that functions to transport the materials under pressure through individual flexible lines 18 and 19 into the mixing chamber of the gun. Air under pressure is also delivered into the mixing chamber from a compressor 20 via a third line 21. In practice, the supply drums and the compressor are situated at a central location and are connected to the gun by means of relatively long lines to enable the gun to be moved to a remote location some distance away.

In practice, the rate of flow of the three materials moving through the lines is accurately controlled to insure that they are mixed in the proper quantities to produce high quality insulation. In the mixing chamber, the resin and the foaming agent are blended together with air to create a gel-like substance that will harden rapidly. The resin and foaming agent form a glue-like material which is coated upon bubbles of air to create a foam having the consistency of shaving cream. Once injected into the cavity, the foam fills the cavity void and then quickly hardens into a homogenous mass of insulation having extremely good insulating properties.

As illustrated in FIG. 1, a turbine flow sender 25 is operatively connected into each of the three flow lines downstream from the supply reservoir. Each flow sender is adapted to send a steady flow of information in the form of pulses to one of three control channels. The control channels are schematically depicted as boxes 26–28. As will be explained in greater detail below, the flow data that is sensed by the sender is processed in controller channel and an output signal is generated which automatically positions a motorized control valve 29 situated in the associated line. Preferably, the valve is positioned somewhere between the fluid supply reservoir and the flow sender so that the sender is able to sense the corrections in flow rates as they are being made.

Each flow channel is basically of the same design and is capable of acting independently to control the individual flows. However, a zero flow detection circuit is herein provided which enables each of the channels to cross talk with the other channels to monitor the flow activity thereof so that the system is able to sense the difference between a line restriction and the closing down of the gun and takes the proper action in response to each situation. In light of the fact that each of the flow channels is the same and the cross talk circuitry operates in the same manner, the present invention will be explained in regard to the interrelationship of the resin control channel and the foaming agent control channel only.

Figure 4:
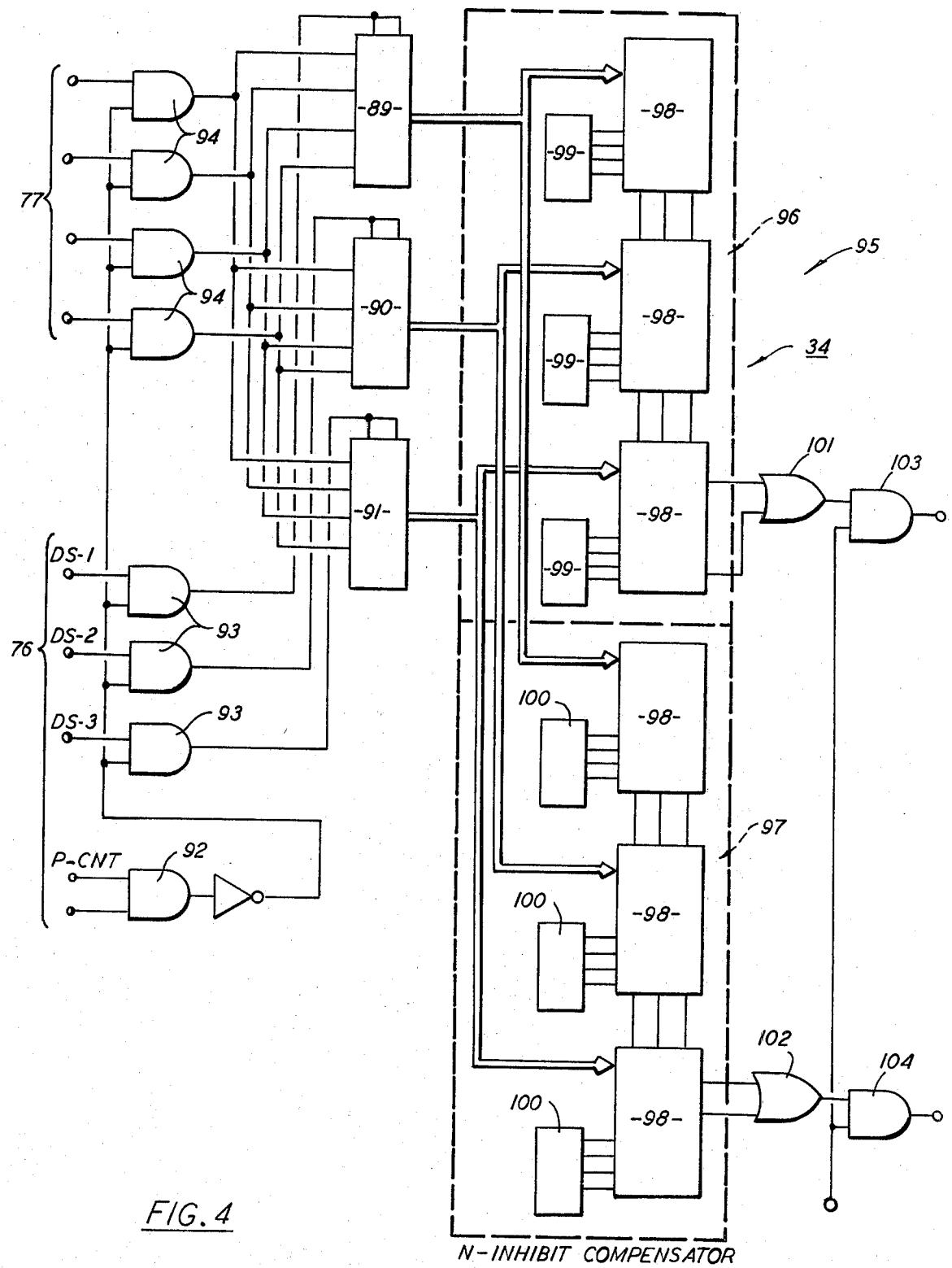
FIG. 4 is also a circuit diagram of the limit detecting circuitry associated with each of the individual flow channels.

With further reference to FIGS. 2–4, the informational pulses from the resin turbine flow sender are applied to the input terminal 31 of the resin flow control channel 30. The pulses generated by the foaming agent sender are likewise applied to the input terminal 31 of the foaming agent flow control channel 32. As previously noted, each channel contains the same components that include a flow meter 33, an over-under limit detector 34, a motor control unit 35, a reversible motor 36, a gear drive 37 and a motorized control valve 29 that is attached to the gear drive via a shaft 39.

The flow-meter circuit 33 employed in each channel is shown in greater detail in FIG. 3. The output of the flow sender is applied to the base of a transistor 40 whereby the amplitude of the pulses sent by the sender is increased to TTL levels. The amplified signal information is next applied to a Schmitt trigger 41 and the form of the incoming signal is changed from a typical sine wave to a square wave output. The Schmitt trigger also functions to reduce the unwanted effects of random noise by means of its built-in hysteresis effect.

The output pulses from the trigger are passed through a gate 42 into a cascade decade counter made up of a hundredth counter 45, a tenths counter 46, and a units counter 47. The gate 43 is enabled by receipt of a P-CNT signal from the system clock 49.

The clock signals are developed by an astable multivibrator 50 which generates a positive going P-CLK pulse signal at output terminal 51. The positive signal is passed through an inverter 53 to also provide a second negative going N-CLK signal. The positive going output of the multivibrator is also applied to a pair of series connected decade counters 54 and 55 to produce a negative divided by 100 output noted as N-CNT at terminal 56. The negative count signal is also inverted by inverter 57 to provide a positive going signal P-CNT. This signal is, as noted, used to enable gate 43 although the electrical connection is not shown in FIG. 3.

The accumulated count in the decade counter is passed on to the decade latches 60, 61 and 62 where the count is stored. Upon passing the count to the latches, the counters are reset and a new count is initieated. The shifting of the latches and the resetting of the counters is controlled by means of control circuit 65 that includes two D-type edge trigger flip-flops 66 and 67.

Upon the generation of a negative count pulse at the output of the clock, the first flipflop 66 in the control circuit 65 is triggered thereby allowing the next positive going clock pulse to pass through gate 68 and inverter 69. The positive pulse is applied to the latches to set the count. This occurrence also triggers flipflop 67 which, in turn, enables gate 70. Accordingly, upon the occurrence of the next negative going clock pulse, the counters are reset through inverter 71 and the state of flipflop 66 changed preparatory to the start of a new counting cycle.

The BCD count stored in the latches is sent to a multiplexer 78 by the Q output lines of the counters. From the multiplexer, the data is multiplexed onto the data buss lines 77 via a tri-state buffer network.

Three control signals DS-1, DS-2 and DS-3 are employed to provide an indication as to whether the required data information is on the buss lines. The control signals are generated by means of a control generator 79 that includes a BCD-to-decimal decoder 80 arranged to act in conjunction with a decade counter 81. The counter is utilized as an asynchronous BCD generator in the control circuit and serves to feed the subject control signals onto the control lines designated generally as 76 in FIG. 3.

The main clock 49 puts out a steady stream of positive going pulses of extremely short duration. Through means of the divider network, count pulses of a longer duration are developed at terminal 56. When the positive count pulse is true, the counters will accumulate data from the sender. Upon the P-CNT signal going false, the accumulated count is passed to the latches and stored when the next positive clock pulse P-CLK passes through the enabled gate 68 as noted above. Gate 70 is now also enabled whereupon the next positive going clock pulse resets the three counters and a new sampling period is started on the next positive going clock output signal.

As illustrated in FIG. 3, the positive going clock pulses are also applied to the signal generator 79. Control signals are clocked out of the generator upon receipt of each positive clock pulse. In practice, the data buss 77 is unidirectional and is adapted to send the multiplexed data to a 7-segment decoder 83 which is arranged to drive three light-emitting diodes 84–86 that form a digital readout display referenced 82. A digit selector 87 is adapted to fire a transistor associated with each LED to sequence the diode in response to a digit being multiplexed onto the buss line. The selector enables each LED on receipt of a P-CLK signal pulse. The sequencing of the LED is rapid enough to permit the three digit number representing the sensed flow count to be displayed in the display window without appreciably disturbing the readout presentation.

As shown in FIG. 2, the information from the buss lines 77 and the control lines 76 is applied to an over-under limit detector 34. The circuitry contained in each of the three limit detectors is shown in greater detail in FIG. 4. The multiplexed BCD data and the control signal data are gated into three receiving latches 89–91 by means of a series of AND gates as illustrated. The main control gate 92 is enabled by the applicator closing the trigger of the gun which initiates the flow of material through each line. This permits the next P-CNT pulse to pass gate 92 and thus enable the remaining gates 93 and 94 allowing data to be loaded into the latches 89–91. The data is loaded into the latches using DS-1, DS-2 and DS-3 pulses to strobe the hundredth, tenths and unit data from the flow meter circuit into the operatively associated latches in the limit detector circuit through gates 94—94.

The outputs of the latches 89–91, in turn, are fed into a comparitor network generally referenced 95 having an upper limit section 96 and a lower limit section 97. Each section contains three magnitude comparitors 98 of similar construction. In the comparitors the flow rate numbers contained in the latches are compared to an upper limit set into the upper limit section via thumb wheel switches 99—99. A lower limit is set into the lower limit section via thumb wheel switches 100—100.

In the event the data provided by the latches 89–91 exceeds the selected upper limit, a true logic signal is generated at the output of gate 101. When the data is below the selected lower limit, a true logic signal is generated at the output of gate 102. The output of gate 101 is applied to a gate 103 while the output of gate 102 is applied to gate 104. When gates 103 and 104 are enabled, as will be described below, the over or under signals will pass on to the motor control unit 35 which in turn will cause the motor to open or close valve 29 thereby correcting the flow rate.

A zero detection circuit, generally referenced 105 in FIG. 2, is adapted to automatically inhibit gates 103 and 104 when the gun is placed in an inoperative condition. Ordinarily, each channel will normally attempt to institute corrective action when the gun is shut down by moving the flow control valve to a fully opened position, simply because the system can not differentiate this condition from a flow restriction. Accordingly, when the gun is again switched on, the flow is out of limits and the control system must attempt to find the desired rate. Consequently, as the system searches, poor foam is being produced and a good deal of material is wasted.

The Q outputs from both the tenths and the units latches 61 and 62, which are located in the flow metering circuit of each channel, are applied to a NAND gate 107. The output terminal 108 of the gate is electrically tied to the base of a transistor 109. When the system is in operation, the transistor is normally operating. The collector of the transistor is connected to the limit detector output gates 103 and 104 via an inverter 110. When the transistor is conducting, pull up resistor 111 can no longer hold the logic level at a logic 1 and therefore the logic zero is applied to the invertor which, in turn, generates an enabling signal that is applied to the gates.

In the event the flow rate in the channel falls below 0.01 units, all the inputs to the NAND gate are at a logic 1 state and the output of the gate goes to a logic 0 state. This action turns the transistor 109 off. The collector pull up resistor will allow the collector to go to a logic 1 state thereby disabling the gates 103 and 104 and thus disconnecting the motor control circuit from the limit detector.

It should be noted that the collectors of the three transistors are tied together by lines 113 and 114. If the flow rate in all three channels falls below 0.01 units, all three transistors will switch off and all three flow circuits will shut down automatically. This condition is only reached when the gun is turned off. If, however, one or two of the transistors switch off due to line restrictions or the like, the remaining transistor or transistors will be conducting on state thereby not permitting the pull up resistors to disenable gates 103 and 104. As can be seen, in this way the various fluid control channels can communicate with one another and automatically determine when the gun is off. This information is used to inhibit flow rate correction for low flow rates sensed when the gun is off.

While this invention has been described with reference to the details as set forth above, it is not limited to the specific structure as disclosed and the invention is intended to cover any modifications or changes as may come within the scope of the following claims.

I claim:

1. A fluid control apparatus of the type wherein a plurality of fluids are delivered by means of a like number of lines to a mixing device, said apparatus including
    a sensing means positioned in each line for developing a rate signal that is indicative of the flow passing through said line,
    a comparator means operatively connected to each of the sensing means for comparing the rate signal of said sensing means with a selected rate and producing an upper control signal when the sensed rate is above the selected rate and a lower control signal when the sensed rate is below the selected rate,
    a control valve means contained in each of said lines that is responsive to said comparator means for increasing the flow rate in the line when a lower control signal is generated by said comparator means and for decreasing the flow rate when the upper control signal is generated by said comparator means, and
    circuit means for monitoring the rate signals developed by each sensing means and for inhibiting the comparator means in the event all the rate signals fall simultaneously below a predetermined rate.

2. The fluid control apparatus of claim 1 wherein said sensing means includes
    a turbine flow sender positioned in the flow stream the sends out a continuous stream of pulses in response to the amount of fluid moving in the line,
    a counter connected to the turbine for counting said pulses,
    latch means connected to the counter for periodically storing the count, and
    timing means for passing the stored count on to the comparator means.

3. The fluid control apparatus of claim 2 wherein said circuit means includes gating means for passing the control signals to the control valve and switching means for enabling the gating means when the rate signals are charging at different increments and for disabling each of the gates when the rate signal falls uniformly below a given rate.

4. The fluid control apparatus of claim 1 further including programing means for manually setting the preselected rate into each of the comparator means.

5. The fluid control apparatus of claim 2 wherein the turbine flow sender is positioned in the line between the control valve and mixing device.

6. Control apparatus for use in the production of foam insulation wherein a resin and a foaming agent are mixed with air within a gun, the apparatus including a compressor for raising the pressure of the air and delivering the air to the gun through a first line, pumping means for delivering the resin and foaming agent to the gun through second and third lines, a flow metering unit positioned in each of the lines having a turbine in contact with the flow for sending out a stream of pulses indicative of the flow rate, a counter for counting said pulses and a storage means for periodically storing the count, a comparator unit operatively associated with the storage means for comparing the stored count with a preselected count and generating an upper control signal when the stored count is above the preselected count and a lower control signal when the stored count is below the preselected count, a motorized control valve positioned in each line that is responsive to the control signal generated by the comparator unit for slowing the flow rate when an upper control signal is generated and for increasing the flow when a lower control signal is generated, and monitoring means for sampling the count in each of the counters and inhibiting the comparator means when the three counts all fall below a given value.

7. The control apparatus of claim 6 wherein said monitoring means includes a gating means for passing the control signals from the comparator unit to the motorized control valve and switching means for enabling the gating means when any of the counts are above the given value and disabling the gating means when all the counts fall below the given value.

8. The control apparatus of claim 6 that further includes programable means in said comparator unit for selecting said given value.

9. The control apparatus of claim 8 wherein the given value is a range having an upper limit and a lower limit.

10. The control apparatus of claim 6 that further includes a timer for regulating the activity of the counter and the storage means.

11. The control apparatus of claim 6 wherein the turbine is positioned in each line between the gun and the control valve.

* * * * *